United States Patent [19]

Emoto

[11] Patent Number: 5,679,384
[45] Date of Patent: Oct. 21, 1997

[54] INJECTION APPARATUS FOR AN ELECTRIC INJECTION MOLDING MACHINE

[75] Inventor: Atsushi Emoto, Chiba, Japan

[73] Assignee: Sumitomo Heavy Industries, Ltd., Japan

[21] Appl. No.: 591,794

[22] Filed: Jan. 25, 1996

[30] Foreign Application Priority Data

Jan. 27, 1995 [JP] Japan .................. 7-011984

[51] Int. Cl.$^6$ .................................................. B29C 45/77
[52] U.S. Cl. ..................... 425/145; 264/40.7; 425/149; 425/167; 425/542
[58] Field of Search .................... 425/145, 149, 425/167, 542; 264/40.7

[56] References Cited

U.S. PATENT DOCUMENTS

| | | | |
|---|---|---|---|
| 4,755,123 | 7/1988 | Otake | 425/145 |
| 4,879,077 | 11/1989 | Shimizu et al. | 425/145 |
| 5,129,808 | 7/1992 | Watanabe et al. | 425/145 |
| 5,332,382 | 7/1994 | Kasai et al. | 425/145 |

*Primary Examiner*—Tim Heitbrink
*Attorney, Agent, or Firm*—Lorusso & Loud

[57] ABSTRACT

An injection apparatus for an electric injection molding machine includes a drive unit case, a metering motor, an injection motor disposed to be coaxial with the metering motor, a first drive force transmission mechanism connected between the metering motor and a screw, being adapted to prevent relative rotational movement while allowing relative axial movement, a motion conversion mechanism for converting rotational movement to linear movement so as to advance the screw, a second drive force transmission mechanism for preventing relative rotational movement while allowing relative axial movement, and a third drive force transmission mechanism for preventing relative axial movement while allowing relative rotation. Since it is unnecessary to use timing belts for advancing and retracting movement and rotational movement of the screw, no noise is generated during drive, and maintenance and management are facilitated. In addition, accuracy in controlling the speed, position and the like of the screw is enhanced.

7 Claims, 5 Drawing Sheets

INJECTION APPARATUS FOR AN ELECTRIC INJECTION MOLDING MACHINE

BACKGROUND OF THE INVENTION

1. Field of the Invention

The present invention relates to an injection apparatus for an electric injection molding machine.

2. Description of the Related Art

Conventionally, in an injection molding machine, resin heated and melted in a heating cylinder is injected into a cavity of a die under a high pressure so that the cavity is filled with the resin. The molten resin is then cooled and hardened to obtain a molded product. The molded product is then taken out from the die after the die is opened.

The injection molding machine includes a die clamp apparatus and an injection apparatus. The die clamp apparatus is provided with a stationary platen and a movable platen, and a movable die is contacted with and separated from a stationary die by advancing and retracting the movable platen using a die clamping cylinder.

The injection machine includes a heating cylinder for heating and melting resin supplied from a hopper and an injection nozzle for injecting the molten resin. Further, a screw is disposed within the heating cylinder for advancing and retracting movement. The screw is advanced to inject resin and retracted to meter the resin.

An electric injection molding machine has been proposed in which electric motors are used to advance and retract the injection apparatus and to advance and retract the screw.

Figure 1:
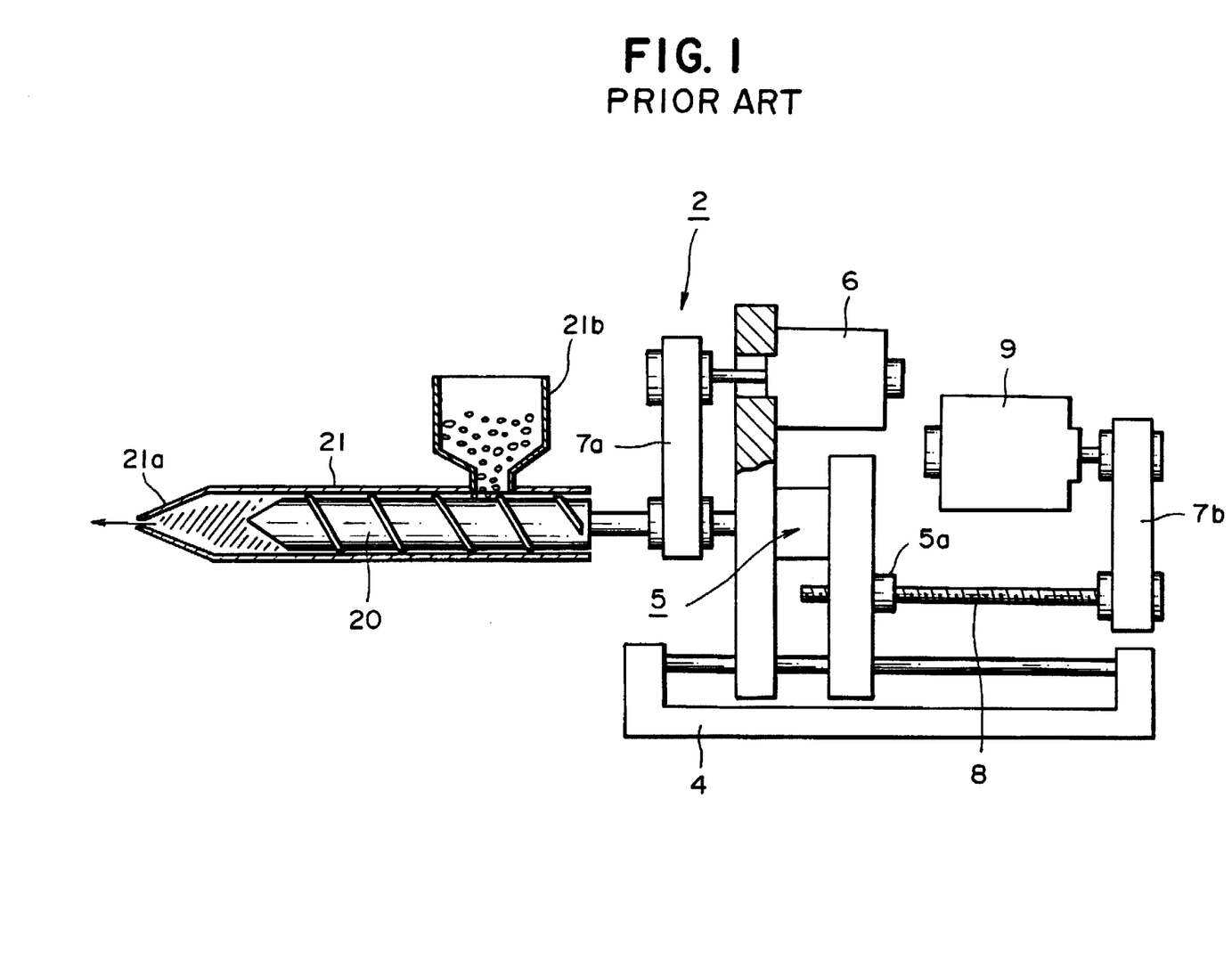
FIG. 1 is a schematic view of an injection apparatus used in a conventional electric injection molding machine.

FIG. 1 is a schematic view of an injection apparatus used in a conventional electric injection molding machine.

In FIG. 1, numeral 2 denotes an injection apparatus, and numeral 4 denotes a frame of the injection apparatus 2. A heating cylinder 21 is fixedly provided on the front side (left side in FIG. 1) of the frame 4, and an injection nozzle 21a is provided at the front end (left-side end in FIG. 1) of the heating cylinder 21. A hopper 21b is disposed on the heating cylinder 21, and a screw 20 is disposed within the heating cylinder 21 such that the screw 20 is rotatable and axially movable. The rear end (right-side end in FIG. 1) of the screw 20 is rotatably supported by a support member 5.

A first servomotor 6 is attached to the support member 5, and rotation of the first servomotor 6 is transmitted to the screw 28 via a timing belt 7a.

Further, a screw shaft 8 is rotatably supported on the frame 4 in parallel with the screw 20, and the rear end of the screw shaft 8 is connected to a second servomotor 9 via a timing belt 7b. Therefore, the screw shaft 8 can be rotated by the second servomotor 9. The front end of the screw shaft 8 is in screw engagement with a nut 5a fixed to the support member 5. Accordingly, the nut 5a can be moved axially by rotating the screw shaft 8 by the second servomotor 9 via the timing belt 7b.

Next, the operation of the injection apparatus 2 having the above-described structure will be described.

In a metering stage, the first servomotor 6 is driven to rotate the screw 20 via the timing belt 7a, thereby retracting the screw 20 by a predetermined amount. At this time, resin supplied from the hopper 21b is heated and melted within the heating cylinder 21, and accumulates on the front side of the screw 20 as the screw 20 is retracted.

In a subsequent injection stage, the injection nozzle 21a is pressed against an unillustrated die, and the second servomotor 9 is driven to rotate the screw shaft 8 via the timing belt 7b. At this time, with the rotation of the screw shaft 8, the support member 5 is moved to advance the screw 20. As a result, the resin accumulated on the front side of the screw 20 is injected from the injection nozzle 21a.

Figure 2:
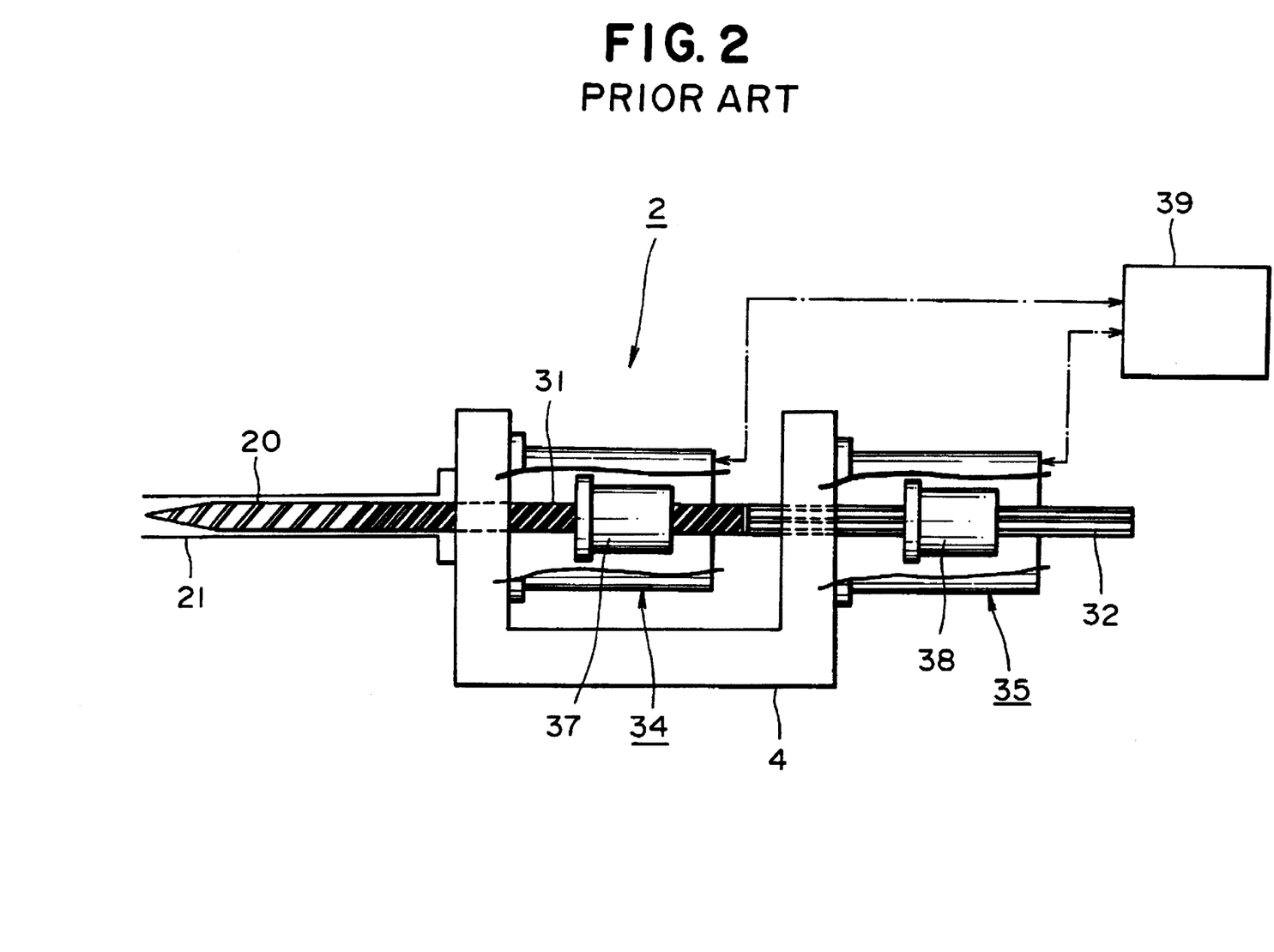
FIG. 2 is a schematic view of another injection apparatus used in a conventional electric injection molding machine.

FIG. 2 is a schematic view of another injection apparatus used in a conventional electric injection molding machine.

In FIG. 2, numeral 2 denotes an injection apparatus, and numeral 4 denotes a frame of the injection apparatus 2. A heating cylinder 21 is fixedly provided on the front side (left side in FIG. 2) of the frame 4, and an unillustrated injection nozzle is provided at the front end of the heating cylinder 21. A screw 20 is disposed within the heating cylinder 21 such that the screw 20 is rotatable and axially movable. A ball screw 31 is formed extending from the rear end of the screw 20 and a spline shaft 32 is formed extending from the rear end of the ball screw 31.

A through motor 34 for injection is attached to the frame 4 such that the through motor 34 surrounds the ball screw 31, and a ball screw nut 37 is fixed to the through motor 34. Further, a through motor 35 for metering is disposed such that the through motor 35 surrounds the spline shaft 32, and a spline nut 38 is fixed to the through motor 35.

A numerical controller 39 is connected to the through motor 34 for injection and to the through motor 35 for metering. Injection and metering are performed by selectively rotating these motors 34 and 35 by the numerical controller 39. In detail, in a metering stage, the through motor 35 for metering and the through motor 34 for injection are simultaneously rotated at the same speed, so that the spline shaft the ball screw 31 and the screw 20 rotate for metering. At this time, power supplied to the through motor 34 for injection may be adjusted to provide a difference in rotational speed between the ball screw nut 37 and the spline nut 38, thereby retracting the screw 20. With this operation, back pressure can be controlled during metering.

In an injection stage, the through motor 34 for injection is rotated while the through motor 35 for metering is stopped, so that the ball screw 31 is advanced by rotation of the ball screw nut 37. As a result, the screw 20 is advanced to perform injection.

However, in the conventional injection apparatus shown in FIG. 1, noise is produced by the timing belts 7a and 7b. Also, the injection apparatus is large because the first and second servomotors 6 and 9 are not disposed on the same axis as that of the screw 20. Further, wear of the timing belts 7a and 7b makes maintenance and management troublesome, and the elasticity of the timing belts 7a and 7b degrades accuracy in controlling the speed, position and the like of the screw 20. In addition, since the first servomotor 6 is advanced and retracted together with the screw 20, the reliability of wiring for the motor and the like becomes low.

In the conventional injection apparatus shown in FIG. 2, the ball screw 31 and the spline shaft 32 are integrated together, and the ball screw nut 37 screw-engaged with the ball screw 31 is rotated by the through motor 34 for injection, while the spline nut 38 spline-engaged with the spline shaft 32 is rotated by the through motor 35 for metering.

When metering is performed, for example, the through motor 34 for injection is rotated faster than the through motor 35 for metering so as to apply back pressure to the screw 20. Therefore, the through motor 35 for metering and the through motor 34 for injection must be driven in a synchronized manner. However, since the through motor 35 for metering and the through motor 34 for injection are both difficult to control, accuracy in controlling back pressure is inadequate.

When injection is performed, the ball screw nut 37 is rotated, so that a large rotational inertia is produced at the drive section. Therefore, control characteristics such as acceleration are inadequate.

At this time, the through motor 35 for metering restricts rotation of the screw 20. Therefore, the through motor 35 for metering produces a force equal to the rotational force for injection so as to maintain its initial position. Accordingly, the through motor 35 for metering must have a large capacity.

SUMMARY OF THE INVENTION

An object of the present invention is to solve the above-mentioned problems in the conventional injection apparatus for an electric injection molding machine, and to provide an injection apparatus for an electric injection molding machine which facilitates maintenance and management, which enhances accuracy in controlling the speed, position and the like of a screw, and which facilitates the control of motors.

To achieve the above object, the present invention provides an improved injection apparatus for an electric injection molding machine. The injection apparatus includes a drive unit case, a metering motor disposed within the drive unit case, an injection motor disposed within the drive unit case and coaxial with the metering motor, a first drive force transmission means connected between the metering motor and a screw, being adapted to prevent relative rotational movement while allowing relative axial movement, a motion conversion means connected between the injection motor and the screw, being adapted to convert rotational movement to linear movement so as to advance the screw, a second drive force transmission means connected between the drive unit case and the screw, being adapted to prevent relative rotational movement while allowing relative axial movement, and a third drive force transmission means connected between the motion conversion means and the screw, being adapted to prevent relative axial movement while allowing relative rotational movement.

In this injection apparatus, when the injection motor is driven in an injection stage, rotation produced by the injection motor is transmitted to the motion conversion means, in which the rotational movement is converted into linear movement.

At this time, the metering motor is not driven. Thus, the screw is advanced while being prevented from rotating, so that resin accumulated on the front side of the screw is injected from the injection nozzle.

When the metering motor is driven in a subsequent metering stage, rotation produced by the metering motor is transmitted to the screw via the second drive force transmission means. Accordingly, the screw is retracted with rotation.

As described above, it is unnecessary to use timing belts for advancing and retracting movement and rotational movement of the screw.

Therefore, no noise is generated during drive, and maintenance and management can be facilitated. In addition, accuracy in controlling the speed, position and the like of the screw can be enhanced.

Since the third drive force transmission means transmits linear movement from the motion conversion means to the screw while allowing the relative rotational movement of the screw, it is unnecessary to synchronously drive the metering motor and the injection motor. This facilitates control of the metering motor and the injection motor, and enhances accuracy in controlling back pressure.

In another embodiment of an injection apparatus for an electric injection molding machine according to the present invention, the first drive force transmission means includes a hollow first rotor shaft fixed to the rotor of the metering motor and rotatably supported with respect to the drive unit case, a first spline nut fixed to the first rotor shaft, and a first spline shaft spline-engaged with the first spline nut.

In still another embodiment of an injection apparatus for an electric injection molding machine according to the present invention, the motion conversion means includes a hollow second rotor shaft fixed to the rotor of the injection motor and rotatably supported with respect to the drive unit case, a ball screw shaft integrally connected to the second rotor shaft and rotatably supported with respect to the drive unit case, and a ball nut screw-engaged with the ball screw shaft, being adapted to be advanced and retracted with rotation of the ball screw shaft.

In yet another embodiment of an injection apparatus for an electric injection molding machine according to the present invention, the second drive force transmission means includes a second spline nut fixed to the drive unit case, and a second spline shaft spline-engaged with the second spline nut.

Also, the present invention provides an injection apparatus for an electric injection molding machine which includes a drive unit case, a metering motor disposed within the drive unit case and including a stator fixed to the drive unit case and a rotor rotatable relative to the stator, an injection motor disposed within the drive unit case to be coaxial with the metering motor and including a stator fixed to the drive unit case and a rotor rotatable relative to the stator, a hollow first rotor shaft fixed to the rotor of the metering motor and rotatably supported with respect to the drive unit case, a hollow second rotor shaft fixed to the rotor of the injection motor and rotatably supported with respect to the drive unit case, a ball screw shaft integrally connected to the second rotor shaft and rotatably supported with respect to the drive unit case, a ball nut screw-engaged with the ball screw shaft, being adapted to be advanced and retracted with rotation of the ball screw shaft, a first spline nut fixed to the first rotor shaft, a first spline shaft spline-engaged with the first spline nut and connected to a screw through its front end, a second spline nut fixed to the drive unit case, and a second spline shaft spline-engaged with the second spline nut, the first spline shaft being rotatably supported by the front end of the second spline shaft and the rear end of the second spline shaft being connected to the ball nut.

When the injection motor is driven in an injection stage so as to rotate the rotor of the injection motor, rotation of the rotor of the injection motor is transmitted to the ball screw shaft via the second rotor shaft. Due to the rotation of the ball screw shaft, a thrust force is generated in the ball nut, whereby the ball nut is advanced.

At this time, the metering motor is not driven and the rotor of the metering motor therefore is in a stopped state. Accordingly, the first spline shaft is advanced without being rotated, so that the screw is advanced. As a result, resin accumulated on the front side of the screw is injected from the injection nozzle.

When the metering motor is driven in a subsequent metering stage so as to rotate the rotor of the metering motor, rotation of the rotor of the metering motor is transmitted to the first spline shaft via the first rotor shaft. The rotation of the first spline shaft is then transmitted to the screw. As a result, the screw is retracted while being rotated. At this time, the injection motor is rotated in a direction for retracting the screw while controlling the back pressure of the resin to be metered.

As described above, it is unnecessary to use timing belts for advancing and retracting movement and rotational movement of the screw.

Therefore, no noise is generated during driving of the screw, and maintenance and management are facilitated. In addition, accuracy in controlling the speed, position and the like of the screw is enhanced.

Since the first spline shaft and the ball nut can rotate relative to each other, it is unnecessary to synchronously drive the metering motor and the injection motor. This facilitates control of the metering motor and the injection motor, and enhances accuracy in controlling back pressure. Moreover, since the rotational force of the injection motor is resisted by the second spline nut, the metering motor does not receive the rotational force. Accordingly, the capacity of the metering motor can be decreased.

Since both the metering motor and the injection motor remain in a fixed position in all stages, the reliability of wiring for the motors and the like is enhanced.

In yet another embodiment of an injection apparatus for an electric injection molding machine according to the present invention, the ball screw shaft, the ball nut, the first spline shaft and the second spline shaft are removably disposed within the first and second rotor shafts.

In this case, the drive unit can be separated into a motor assembly and a drive shaft assembly. Therefore, it is possible to separately manufacture the motor assembly and the drive shaft assembly. After that, the metering motor and the injection motor of the motor assembly are driven to respectively check their operations. After the checking, the drive shaft assembly is inserted into the motor assembly so as to check the operation of the drive unit.

Therefore, the motor assembly and the drive shaft assembly can be maintained and managed separately.

Yet another embodiment of an injection apparatus according to the present invention includes an absolute pulse encoder provided at an end of the ball screw shaft.

In this case, the position of the ball nut is calculated based on an absolute rotational position signal output from the absolute pulse encoder and the lead of the ball screw shaft so as to control the position of the screw.

Therefore, the position of the ball nut can be detected by the absolute pulse encoder, and the position, speed and the like of the screw can be controlled. As a result, it becomes unnecessary to provide an encoder for driving the injection motor. This reduces the cost of the injection apparatus.

In addition, since a mechanism for transmitting drive power is not interposed between the rotor of the injection motor and the ball screw shaft, accuracy in detecting the position of the ball nut is enhanced.

BRIEF DESCRIPTION OF THE DRAWINGS

The structure and features of the injection apparatus for an electric injection molding machine according to the present invention will be readily appreciated as the same becomes better understood by referring to the accompanying drawings, in which.

DESCRIPTION OF PREFERRED EMBODIMENT

An embodiment of the present invention will next be described in detail with reference to the drawings.

Figure 3:
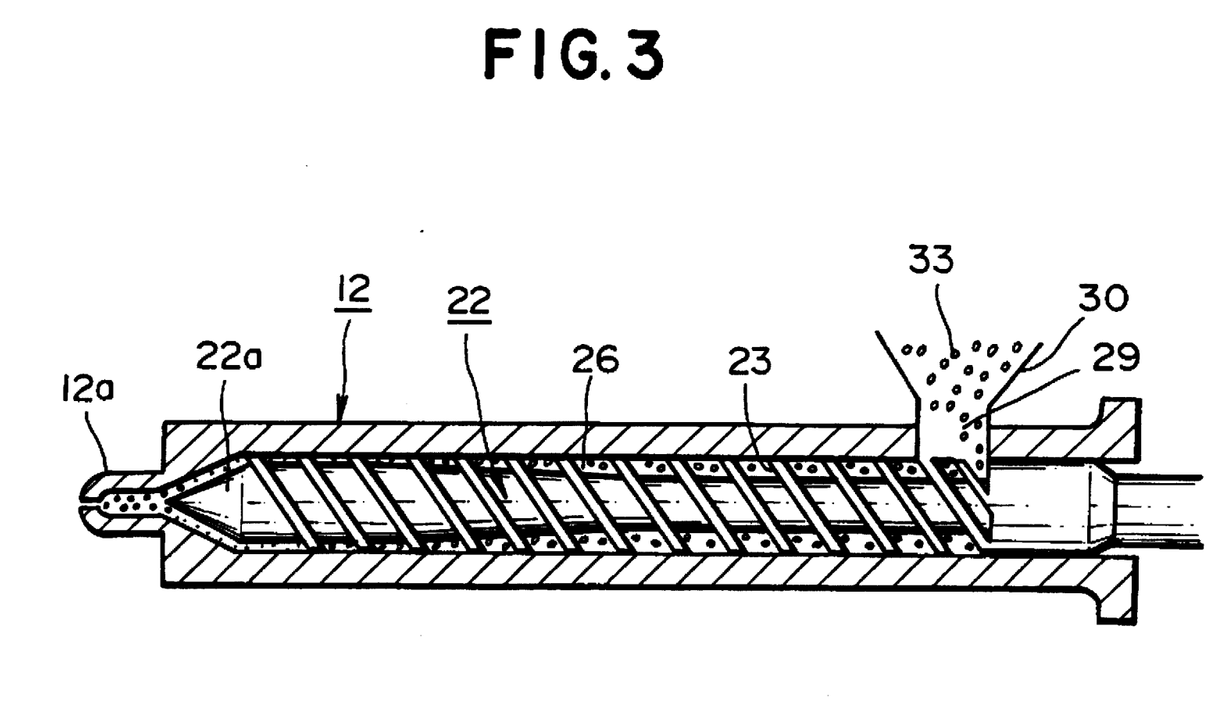
FIG. 3 is a schematic view of a heating cylinder of an electric injection molding machine according to an embodiment of the present invention.

In FIG. 3, numeral 12 denotes a heating cylinder, which has an injection nozzle 12a at its front end (left-side end in FIG. 3). A screw 22 is disposed within the heating cylinder 12 such that the screw 22 is allowed to advance, retract and rotate.

The screw 22 has a screw head 22a at its front end and extends rearward (in the rightward direction in FIG. 3) within the heating cylinder 12. The rear end (right-side end in FIG. 3) of the screw 22 is connected to a drive unit, which will be described later. Also, a spiral flight 23 is formed on the peripheral surface of the screw 22, resulting in the formation of a groove 26.

A resin supply port 29 is formed at a predetermined position on the heating cylinder 12, and a hopper 30 is fixed to the resin supply port 29. The resin supply port 29 is formed at a position such that the resin supply port 29 faces the rear end portion of the groove 26 when the screw 22 is positioned at a forwardmost position (in the leftward direction in FIG. 3) of the heating cylinder 12.

In a metering stage, the drive unit is driven to retract the screw 22 with rotation. With this operation, pelleted resin 33 in the hopper 30 descends and enters the heating cylinder 12. The resin 33 is then advanced along the groove 26.

An unillustrated heater is disposed around the heating cylinder 12. The heating cylinder 12 is heated by the heater so as to melt the resin 33 in the groove 26. Accordingly, when the screw 22 is retracted by a predetermined amount while being rotated, molten resin 33 for one shot accumulates on the front side of the screw head 22a.

In a subsequent injection stage, the screw 22 is advanced without rotation by driving the drive unit. With this operation, the resin 33 accumulated on the front side of the screw head 22a is injected from the injection nozzle 12a, and is charged into a cavity of an unillustrated die.

Next, the driving unit will be described with reference to FIGS. 4 and 5.

Figure 4:
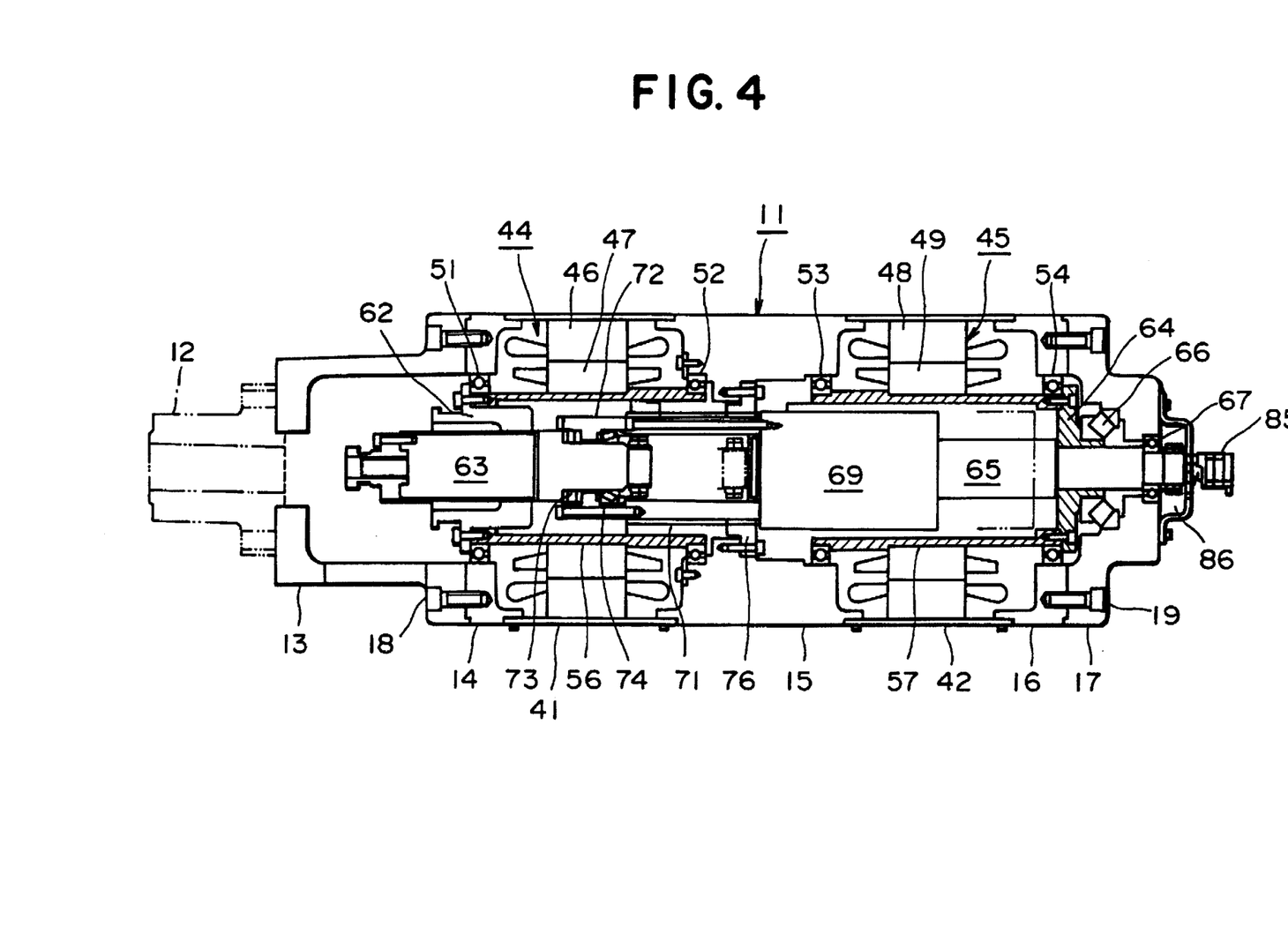
FIG. 4 is a sectional view of a drive unit of an injection apparatus according to the embodiment of FIG. 3.

In FIG. 4, numeral 11 denotes a drive unit case enclosing the drive unit, and the drive unit case 11 is fixed to the rear end (right-side end in FIG. 4) of the heating cylinder 12. The drive unit case 11 comprises a front cover 13, a front support 14, a center support 15, a rear support 16, a rear cover 17, a front frame 41 connecting the front support 14 and the center support 15, and a rear frame 42 connecting the center support 15 and the rear support 16. The front cover 13 is fixed to the front support 14 using bolts 18, and the rear cover 17 is fixed to the rear support 16 using bolts 19.

A metering motor 44 and an injection motor 45 are disposed at front and rear portions of the drive unit case 11, respectively, such that the metering motor 44 and the injection motor 45 share a common rotational axis. The metering motor 44 includes a stator 46 fixed to the front frame 41, and a rotor 47 disposed inside the stator 46. The injection motor 45 includes a stator 48 fixed to the rear frame 42, and a rotor 49 disposed inside the stator 48.

The rotor 47 is supported so as to be rotatable relative to the drive unit case 11. In detail, a hollow first rotor shaft 56 is fitted into the rotor 47 and fixed thereto, and the front end of the first rotor shaft 56 is supported by the front support 14 via a bearing 51 while the rear end of the first rotor shaft 56 is supported by the center support 15 via a bearing 52.

Similarly, the rotor 49 is supported so as to be rotatable relative to the drive unit case 11. In detail, a hollow second rotor shaft 57 is fitted into the rotor 49 and fixed thereto, and the front end of the second rotor shaft 57 is supported by the center support 15 via a bearing 53 while the rear end of the second rotor shaft 57 is supported by the rear support 16 via a bearing 54.

When a current of a predetermined frequency is supplied to the stator 46 of the metering motor 44, the screw 22 (FIG. 3) is retracted while being rotated. To realize this motion, a first spline nut 62 is fixed to the inner circumferential of the front end of the first rotor shaft 56, the first spline nut 62 and a first spline shaft 63 are spline-engaged with each other, and the screw 22 is fixed to the front end of the first spline shaft 63. The first spline nut 62 and the first spline shaft 63 constitute a first drive force transmission means which restricts relative rotational movement and allows relative axial movement. The first spline shaft 63 has a length corresponding to the stroke of the screw 22.

Accordingly, when the rotor 47 is rotated by driving the metering motor 44, the rotation of the rotor 47 is transmitted to the screw 22 via the first rotor shaft 56, the first spline nut 62, and the first spline shaft 63, so that the screw 22 is rotated. As a result, the resin 33 is advanced along the groove 26 while being gradually melted, and the screw 22 is retracted due to back pressure which is generated with the advancement of the resin 33.

Since the first spline nut 62 and the first spline shaft 63 are spline-engaged with each other, the first spline shaft 63 is retracted relative to the first spline nut 62.

Also, the screw 22 can be advanced without rotation by supplying the stator 48 of the injection motor 45 with a current of a predetermined frequency. To realize this motion, an annular bearing retainer 64 is fixed to the rear end of the second rotor shaft 57, and the ball screw shaft 65 is fitted into the central opening of the bearing retainer 64 and fixed thereto. The ball screw shaft 65 is supported to be rotatable with respect to the drive unit case 11. In detail, the ball screw shaft 65 is supported by the bearing 66 via the bearing retainer 64 and is also supported by the rear cover 17 via a bearing 67 disposed on the rear side of the bearing 66.

A ball nut 69 is disposed within the second rotor shaft 57 in an axially movable manner. The ball nut 69 is screw-engaged with the ball screw shaft 65 to constitute a motion conversion means. Accordingly, rotation of the rotor 49 is transmitted to the ball screw shaft 65 via the second rotor shaft 57 and the bearing retainer 64, so that the rotational movement of the rotor 49 is converted into linear movement to advance and retract the ball nut 69.

To prevent the ball nut 69 from rotating together with the ball screw shaft 65, a second spline shaft 71 is fixed to the front end of the ball nut 69, and a second spline nut 76 fixed to the center support 15 is spline-engaged with the second spline shaft 71. The second spline nut 76 and the second spline shaft 71 constitute a second drive force transmission means which restricts relative rotational movement and allows relative axial movement. The second spline shaft 71 has a length corresponding to the stroke of the screw 22.

A bearing box 72 serving as a third drive force transmission means is fixed to the front end of the second spline shaft 71. A thrust bearing 73 is disposed in the front end portion of the bearing box 72 while a bearing 74 is disposed in the rear end portion of the bearing box 72. In this case, the bearing box 72 restricts relative axial movement and allows relative rotational movement. Accordingly, the first spline shaft 63 is supported by the thrust bearing 73 and the bearing 74 while being allowed to rotate relative to the second spline shaft 71 and the ball nut 69. Numeral 85 denotes an absolute pulse encoder for detecting the position of the screw 22, and numeral 86 denotes a bracket for supporting the absolute pulse encoder 85.

Next, the operation of the drive unit having the above-described structure will be described.

When a current is supplied to the stator 48 of the injection motor 45 in an injection stage, the rotor 49 is rotated, and the rotation of the rotor 49 is transmitted to the ball screw shaft 65 via the second rotor shaft 57 and the bearing retainer 64, so that the ball screw shaft 65 is rotated. Since the second spline nut 76 fixed to the center support 15 is spline-engaged with the second spline shaft 71, the ball nut 69 does not rotate. Accordingly, a thrust force is generated in the ball nut 69 whereby the ball nut 69 is advanced.

During the above-described injection stage, the metering motor 44 is not driven, and the rotor 47 is therefore in a stopped state. Accordingly, the first spline shaft 63 disposed on the front side of the ball nut 69 is advanced without being rotated so as to advance the screw 22.

As described above, rotational movement produced by the injection motor 45 is converted into linear movement by the ball screw shaft 65 and the ball nut 69. As a result, the resin 33 accumulated on the front side of the screw 22 is injected from the injection nozzle 12a.

When a current is supplied to the stator 46 of the metering motor 44 in a subsequent metering stage, the rotor 47 is rotated, and the rotation of the rotor 47 is transmitted to the first spline shaft 63 via the first rotor shaft 56 and the first spline nut 62, so that the first spline shaft 63 is rotated. The rotation of the first spline shaft 63 is then transmitted to the screw 22 so as to rotate the screw 22. With the rotation of the screw 22, the resin 33 is advanced along the groove 26 while being gradually melted, and the screw 22 is retracted due to back pressure which is generated with the advancement of the resin 33.

Since the first spline nut 62 and the first spline shaft 63 are spline-engaged with each other, the first spline shaft 63 is retracted relative to the first spline nut 62.

The injection motor 45 is driven while controlling the back pressure of the resin 33 to be metered, and the rotor 49 is rotated in a direction for retracting the screw 22. The back pressure can be obtained based on, for example, the load applied to the screw 22 and so on in the axial direction which is detected by an unillustrated load sensor, or the pressure of the resin BB within the heating cylinder detected by an unillustrated pressure sensor.

As described above, since the timing belts 7a and 7b (see FIG. 1) are not required for advancing and retracting movement and rotational movement of the screw 22, no noise is generated during drive of the screw, and maintenance and management are facilitated. In addition, accuracy in controlling the speed, position and the like of the screw 22 are enhanced. Moreover, since the ball screw shaft 65 is rotated during injection, rotational inertia is decreased compared to the case where the ball nut 69 is rotated for injection. This improves control characteristics such as acceleration.

Since the first spline shaft 63 and the ball nut 69 can rotate relative to each other via the thrust bearing 73 and the bearing 74, it is unnecessary to synchronously drive the metering motor 44 and the injection motor 45, so that control of the metering motor 44 and the injection motor 45 becomes easier. In addition, accuracy in controlling the above-described back pressure is enhanced. Moreover, since the rotational force of the injection motor 45 is resisted by the second spline nut 76, the metering motor 44 does not receive the rotational force. Accordingly, the capacity of the metering motor 44 can be decreased.

Since both the metering motor 44 and the injection motor 45 can remain in a fixed position in all stages, the reliability of wiring for the motors and the like is enhanced.

Figure 5:
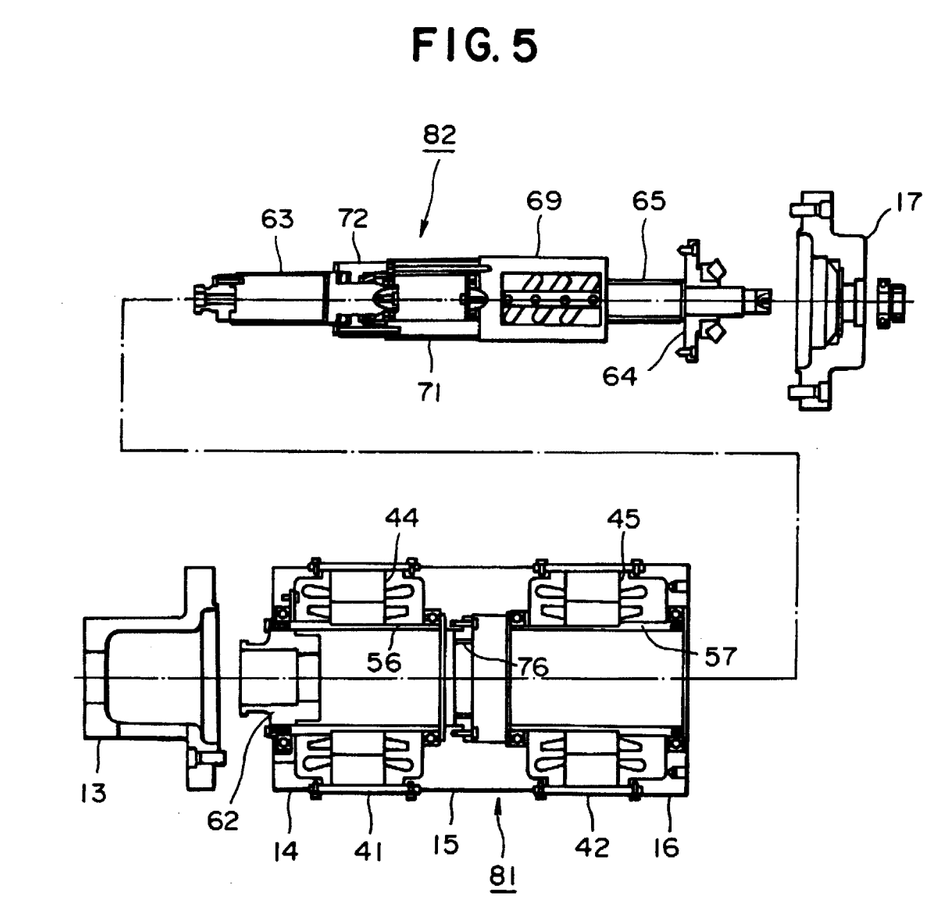
FIG. 5 is an exploded view of the drive unit of the injection apparatus according to the embodiment of FIG. 3.

The drive unit of the injection apparatus having the above-described structure can be separated into a motor assembly 81 and a drive shaft assembly 82, as shown in FIG. 5.

The motor assembly 81 comprises the front support 14, the center support 15, the rear support 16, the front frame 41, the rear frame 42, the metering motor 44, the injection motor 45, the first rotor shaft 56, the second rotor shaft 57, the spline nut 62, the spline nut 76, and the like. The drive shaft assembly 82 comprises the spline shaft 63, the bearing retainer 64, the ball screw shaft 65, the ball nut 69, the spline shaft 71, the bearing box 72, and the like.

Accordingly, it is possible to separately manufacture the motor assembly 81 and the drive shaft assembly 82. After that, the metering motor 44 and the injection motor 45 of the motor assembly 81 are driven to respectively check their operations. After the checking, the drive shaft assembly 82 is inserted into the motor assembly 81, and the front cover 13 and the rear cover 17 are fixed to the motor assembly 81. The operation of the drive unit is then checked.

Therefore, the motor assembly 81 and the drive shaft assembly 82 can be maintained and managed separately.

Moreover, a bracket 86 is fixed to the rear cover 17, and an absolute pulse encoder 85 is attached to the bracket 86 such that the absolute pulse encoder 85 faces the end portion of the ball screw shaft 65. When the injection motor 45 is driven in an injection stage so as to rotate the second rotor shaft 57, the ball screw shaft 65 is rotated. During this operation, the absolute rotational position of the ball screw shaft 65 is detected by the absolute pulse encoder 85.

The position of the ball nut 69 is calculated based on the absolute rotational position signal (absolute signal) output from the absolute pulse encoder 85, and the lead of the ball screw shaft 65 (the amount of movement of the ball nut 69 per revolution) so as to control the position of the screw 22. In this case, a difference between the actual position of the ball nut 69 and the position obtained by the calculation results if play (backlash) exists between the ball screw shaft 65 and the ball nut 69. However, such an error can be mostly eliminated by using a pre-load type ball screw device as the ball screw shaft 65. Since no mechanism for transmitting drive power is interposed between the rotor 49 and the ball screw shaft 65, accuracy in detecting the position of the ball nut 69 is enhanced.

When a servomotor is used as the injection motor 45, an absolute pulse encoder 85 for motor control is provided to feed back the number of rotations of the rotor 49, pulses corresponding to the rotation of the rotor 49, or the like so as to perform positional control, speed control and the like for the screw 22.

In the present embodiment, since the rotor 49 and the ball screw shaft 65 are connected with each other via the second rotor shaft 57 and the bearing retainer 64, difference in speed is not produced between the rotor 49 and the ball screw shaft 65. Accordingly, a signal (incremental signal) representing the number of rotations of the ball screw shaft 65 can be used to control the injection motor 45.

As described above, the use of the absolute pulse encoder 85 makes it possible not only to detect the position of the ball nut 69 but also to perform positional control, speed control and the like for the screw 22. Accordingly, it becomes unnecessary to provide an encoder for driving the injection motor 45. This reduces the cost of the injection apparatus.

The present invention is not limited to the above-described embodiments. Numerous modifications and variations of the present invention are possible in keeping with the spirit of the present invention, and they are not excluded from the scope of the present invention.

What is claimed is:

1. An injection apparatus for an electric injection molding machine, comprising:
  (a) an injection cylinder and an injection screw mounted within said injection cylinder for rotational and linear motion relative to said cylinder;
  (b) a drive unit case;
  (c) a metering motor mounted within said drive unit case for generating said rotational motion;
  (d) an injection motor, mounted within said drive unit case coaxial with said metering motor, for generating rotary motion;
  (e) first drive force transmission means connected between said metering motor and said injection screw, for transmitting said rotational motion from said metering motor to said injection screw;
  (f) motion conversion means connected between said injection motor and said injection screw, for converting said rotary motion of said injection motor to the linear motion for advancing said screw;
  (g) second drive force transmission means, connected between said drive unit case and said injection screw, for preventing transmission of the rotary motion of said injection motor to said injection screw while allowing transmission of the linear motion to said injection screw; and
  (h) third drive force transmission means, connected between said motion conversion means and said injection screw, for transmitting the linear motion from said motion conversion means to said injection screw while allowing rotational motion of said injection screw.

2. An injection apparatus for an electric injection molding machine according to claim 1, wherein:
  said metering motor comprises a first rotor and a hollow first rotor shaft fixed to said first rotor and rotatably supported with respect to said drive unit case; and
  said first drive force transmission means comprises a first spline nut fixed to said first rotor shaft and a first spline shaft spline-engaged with said first spline nut.

3. An injection apparatus for an electric injection molding machine according to claim 1, wherein:
  said injection motor comprises a second rotor and a hollow second rotor shaft fixed to said second rotor and rotatably supported with respect to said drive unit case; and
  said motion conversion means comprises a ball screw shaft integrally connected to said second rotor shaft and rotatably supported with respect to said drive unit case and a ball nut screw-engaged with said ball screw shaft for advancing and retracting linear movement responsive to rotation of said ball screw shaft.

4. An injection apparatus for an electric injection molding machine according to claim 1, wherein said second drive force transmission means comprises:

a second spline nut fixed to said drive unit case; and a second spline shaft spline-engaged with said second spline nut.

5. An injection apparatus for an electric injection molding machine according to claim 1, further comprising an absolute pulse encoder is provided at an end of said ball screw shaft.

6. An injection apparatus for an electric injection molding machine, comprising:

(a) an injection cylinder and an injection screw mounted within said injection cylinder for rotational and linear motion relative to said cylinder;

(b) a drive unit case;

(c) a metering motor mounted within said drive unit case and including a first stator fixed to said drive unit case and a first rotor rotatable relative to said first stator;

(d) an injection motor mounted within said drive unit case coaxial with said metering motor and including a second stator fixed to said drive unit case and a second rotor rotatable relative to said second stator;

(e) a hollow first rotor shaft fixed to said first rotor and rotatably supported with respect to said drive unit case;

(f) a hollow second rotor shaft fixed to said second rotor and rotatably supported with respect to said drive unit case;

(g) a ball screw shaft integrally connected to said second rotor shaft and rotatably supported with respect to said drive unit case;

(h) a ball nut screw-engaged with said ball screw shaft for advancing and retracting linear movement responsive to rotation of said ball screw shaft;

(i) a first spline nut fixed to said first rotor shaft;

(j) a first spline shaft spline-engaged with said first spline nut and having a front end connected to said injection screw;

(k) a second spline nut fixed to said drive unit case; and (l) a second spline shaft spline-engaged with said second spline nut and having a front end and a rear end, said first spline shaft being rotatably supported by the front end of said second spline shaft and the rear end of said second spline shaft being connected to said ball nut.

7. An injection apparatus for an electric injection molding machine according to claim 6, wherein said ball screw shaft, said ball nut, said first spline shaft and said second spline shaft are removably disposed within said first and second rotor shafts.

* * * * *

UNITED STATES PATENT AND TRADEMARK OFFICE
CERTIFICATE OF CORRECTION

PATENT NO. : 5,679,384
DATED : October 21, 1997
INVENTOR(S) : Atsushi EMOTO

It is certified that error appears in the above-indentified patent and that said Letters Patent is hereby corrected as shown below:

Col. 1, line 47, "28" should read --20--.

Col. 2, line 30, after "shaft" insert -- 32,--.

Col. 8, line 51, "BB" should read --33--.

Signed and Sealed this

Twenty-second Day of September, 1998

Attest:

BRUCE LEHMAN

Attesting Officer

Commissioner of Patents and Trademarks